US007954789B2

(12) United States Patent
Elliott et al.

(10) Patent No.: US 7,954,789 B2
(45) Date of Patent: Jun. 7, 2011

(54) COMPOSITE SHAFT AND SELF-CENTERING COUPLING

(75) Inventors: B. James Elliott, Twinsburg, OH (US); Trent Lydic, Lyndhurst, OH (US)

(73) Assignee: Jet, Inc., Cleveland, OH (US)

( * ) Notice: Subject to any disclaimer, the term of this patent is extended or adjusted under 35 U.S.C. 154(b) by 853 days.

(21) Appl. No.: 11/949,968

(22) Filed: Dec. 4, 2007

(65) Prior Publication Data

US 2008/0157408 A1      Jul. 3, 2008

Related U.S. Application Data

(60) Provisional application No. 60/878,372, filed on Jan. 3, 2007.

(51) Int. Cl.
*C02F 1/74* (2006.01)
*C02F 7/00* (2006.01)

(52) U.S. Cl. ............................................ 261/85; 261/87

(58) Field of Classification Search .............. 261/83–85, 261/87, 93; 366/101, 102; 239/8; 210/628, 210/150

See application file for complete search history.

(56) References Cited

U.S. PATENT DOCUMENTS

| | | | | |
|---|---|---|---|---|
| 2,996,287 A | * | 8/1961 | Audran | 366/265 |
| 3,867,488 A | * | 2/1975 | Porterfield | 261/87 |
| 4,608,157 A | * | 8/1986 | Graves | 210/86 |
| 4,645,473 A | | 2/1987 | Mochizuki | |
| 5,336,399 A | * | 8/1994 | Kajisono | 210/170.02 |
| 6,070,734 A | * | 6/2000 | Hunt et al. | 209/169 |
| 6,318,705 B1 | | 11/2001 | MacLaren | |
| 7,784,769 B2 | * | 8/2010 | Hoefken | 261/85 |

OTHER PUBLICATIONS

International Preliminary Report on Patentability for International Application PCT/US07/86496, Jul. 7, 2009, International Bureau of WIPO.

* cited by examiner

*Primary Examiner* — Frank M Lawrence
(74) *Attorney, Agent, or Firm* — The Maubury Law Group PLLC

(57) ABSTRACT

A composite hollow aspirator shaft is formed of fiberglass-reinforced phenolic resin that reduces the amount of vibration that is transferred to the motor rotating the shaft, and the motor's bearings. This extends motor and bearing life. When the aspirator tip is rotated in a liquid, fluidic forces are transferred to the shaft. Rather than transmitting those forces into the motor and its bearings, the composite aspirator shaft attenuates the forces to prevent most of them from reaching the motor and its bearings. The composite shaft material has a flexural modulus, or ratio, within the elastic limit of any applied stress, and is sufficiently low to allow the transfer of the flexural or oscillatory energy into heat within the shaft instead of conveying the energy in the form of vibration/oscillations along the axial length of the shaft. As an added advantage, the fiberglass resists abrasion better in wastewater than stainless steel used in the prior art.

20 Claims, 2 Drawing Sheets

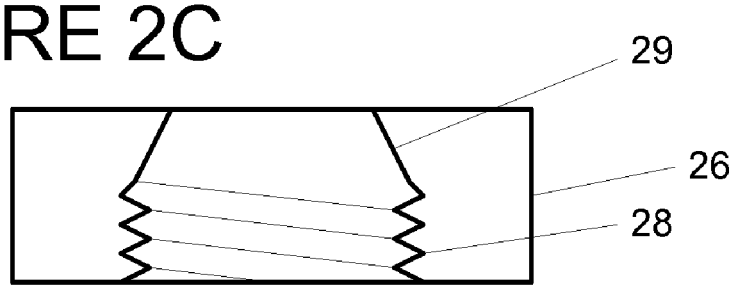
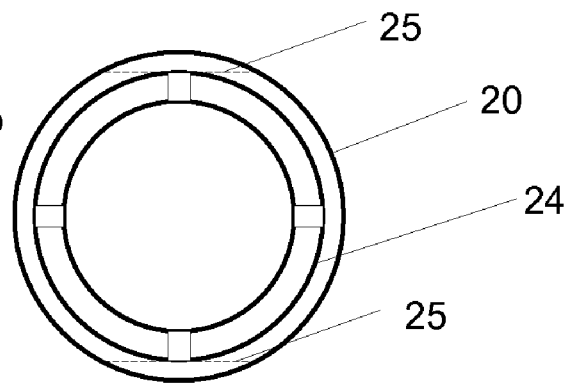
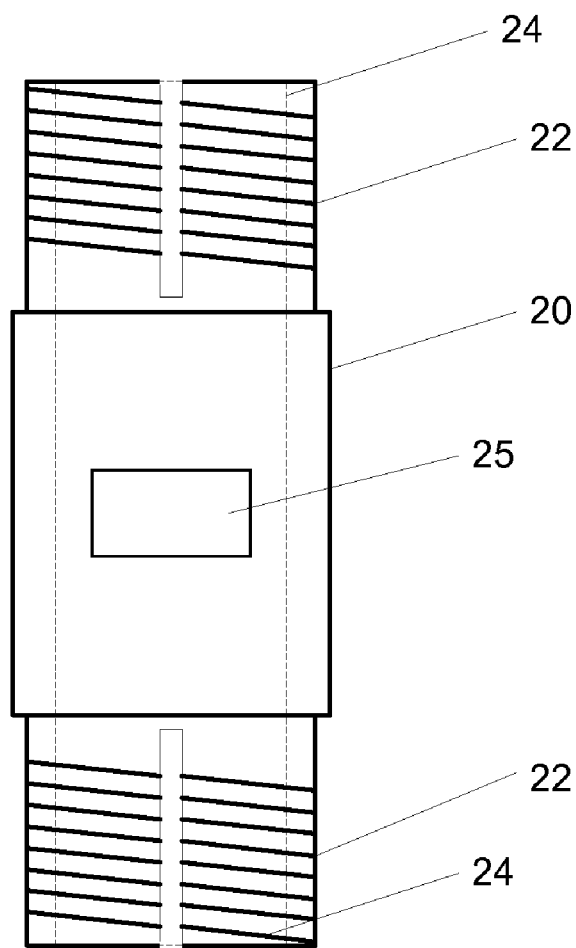

COMPOSITE SHAFT AND SELF-CENTERING COUPLING

RELATED APPLICATIONS

This application claims the benefit of U.S. Provisional Application Ser. No. 60/878,372 filed Jan. 3, 2007, which is hereby incorporated by reference in its entirety for all purposes.

BACKGROUND OF THE INVENTION

Various embodiments relate generally to improvements for mechanical aerators in the form of a composite shaft and coupling that reduces transmission of vibrational energy. More particularly, embodiments are drawn to a composite aspirator shaft and/or coupling for mixing and adding air to wastewater.

Prior art wastewater aspirator shafts typically use a stainless steel aspirator shaft, as illustrated at reference numeral 9 in FIG. 3 of commonly-assigned U.S. Pat. No. 5,484,524.

Russian Patent No. 2176991 to Smirnov et al. discloses a tubular aerator that has a two layer reticular frame that is made of fiberglass and has a dispersing material sandwiched between the two coaxial layers of the fiberglass reticular frame. The fiberglass frame is described as being "air-permeable." It is intended for use in a waste water system.

German Patent No. 19835100 to Spitzenberg et al. discloses a shaft intended for use in a waste water system, the shaft having fiberglass as one intermediate layer that is bonded to a concrete overlying layer by gravel embedded in the resin of the fiberglass layer.

U.S. Pat. No. 3,669,422 to Nogaj discloses an aerator for use in waste water treatment. The general desirability of fiberglass parts is taught.

U.S. Pat. No. 4,157,303 to Yoshikawa et al. discloses a waste water impeller that is made from fiberglass reinforced plastic.

International Patent Application Publication No. WO 97/40273 by Wood et al. discloses a progressive cavity pump having a flexible shaft formed from fiberglass.

U.S. Pat. No. 4,035,856 to Oberg discloses a marker flag with a shaft formed of fiberglass. It is taught that fiberglass has a modulus of elasticity of 3 to 4 million.

U.S. Pat. No. 4,363,603 to Petersen, U.S. Pat. No. 5,011,520 to Carr et al., and U.S. Pat. No. 5,174,877 to Cooper et al. disclose an impeller made from fiberglass.

U.S. Pat. No. 5,573,656 to Santos discloses use of a fiberglass coated steel roller or propeller to mix intermediate sludge materials in making asphalt.

U.S. Pat. No. 4,070,423 to Pierce discloses a waste water aeration apparatus that has a vertical tube disclosed as being formed of fiberglass.

U.S. Patent Application Publication No. 2005/0218074 by Pollock discloses a waste water purification apparatus having a downcomer structure formed of fiberglass.

BRIEF SUMMARY OF THE INVENTION

A hollow, composite shaft for a mechanical aerator is formed of fiberglass-reinforced phenolic resin that reduces the amount of vibration that is transferred to the motor/bearings to extend motor/bearing life. When the aspirator tip is rotated in a liquid, fluidic forces are transferred to the shaft. The present invention attenuates the forces. The composite shaft material has a flexural modulus, or ratio, within the elastic limit of any applied stress, and is sufficiently low to allow the transfer of the flexural or oscillatory energy into heat within the shaft instead of conveying the energy in the form of vibration/oscillations along the axial length of the shaft.

In an embodiment, a hollow shaft incorporates 13-30% fiberglass by total volume and transfers only a fraction of the vibrational energy to the motor/bearings. Also, the fiberglass resists abrasion better in wastewater than stainless steel. The invention has application to any shaft rotating in a liquid and can also be applied to solid shafts.

The composite shaft is attached to a drive shaft of a motor using a self-centering coupling formed of an suitably corrosion-resistant material, such as 6-6 Nylon, fiberglass reinforced phenolic resin, or stainless steel. The centered and balanced design of the coupling reduces vibration caused by prior art couplers, such as that disclosed in FIG. 3 of commonly-assigned U.S. Pat. No. 5,484,524, in which the coupler uses set screws and creates an unbalanced portion due to the eccentric nature of the coupling.

Furthermore, if Nylon or fiberglass reinforced phenolic resin are used, the coupler can attenuate vibrational energy from the shaft.

BRIEF DESCRIPTION OF THE DRAWINGS

FIG. 2A illustrates a coupler body in accordance with an embodiment of the present invention.

FIG. 2B illustrates an end view of a coupler body in accordance with an embodiment of the present invention.

FIG. 2C illustrates a cross sectional view of a nut used in an embodiment of the coupling.

DETAILED DESCRIPTION OF THE INVENTION

Figure 1:
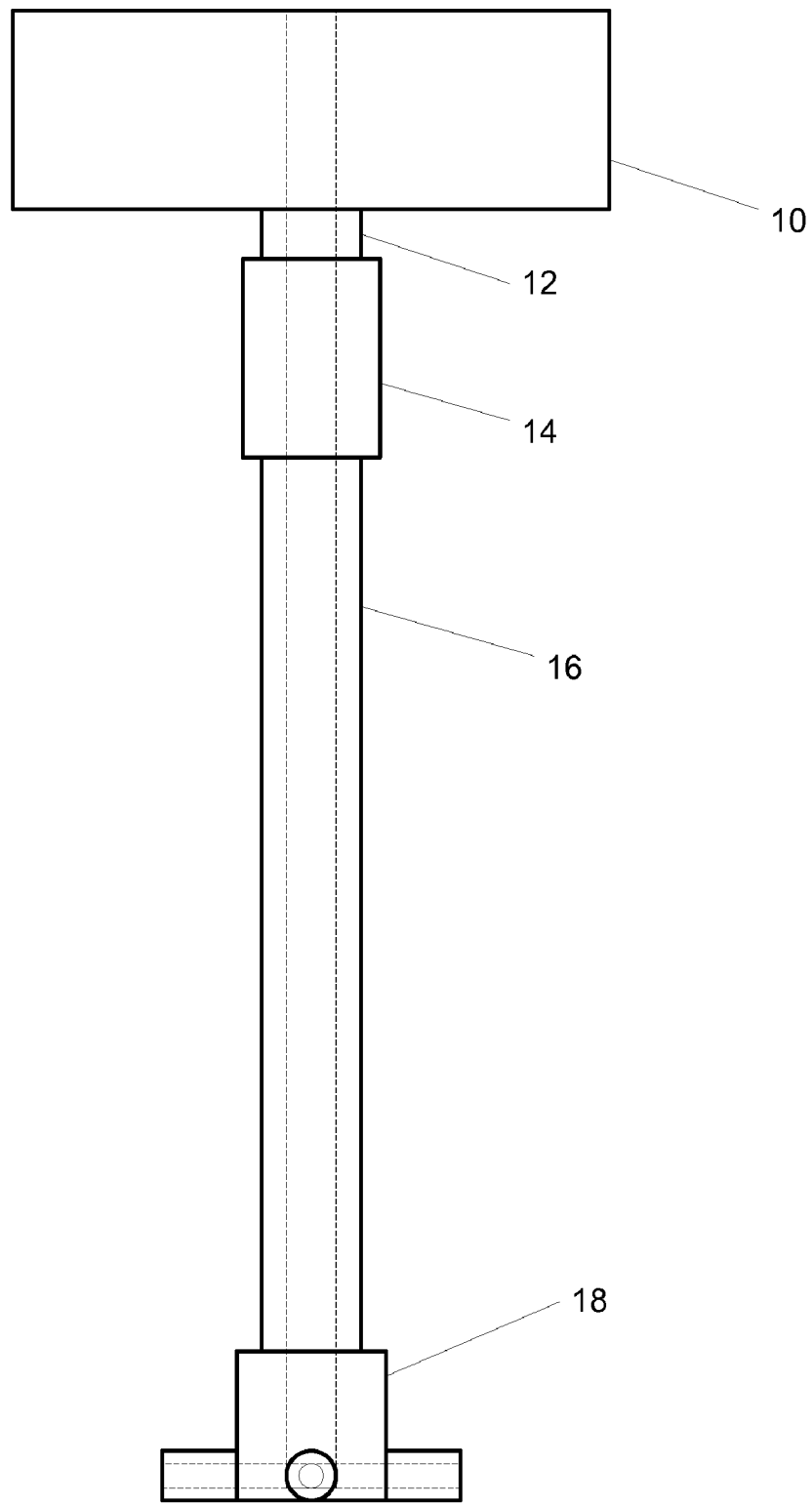
FIG. 1 illustrates an elevation view of one embodiment of the aerator that can employ the present invention.

FIG. 1 is a diagram of a general aerator system in which the present invention can be used (not to scale). The aerator includes a motor 10 which rotates a motor shaft 12. A coupling 14 attaches the motor shaft 12 to aspirator shaft 16 at one end of the aspirator shaft 16. An aspirator tip 18 is attached at the other end of the aspirator shaft 16. In use, the aspirator tip 18 and a substantial portion of the aspirator shaft 16 will be submerged in liquid, such as wastewater. As illustrated, each of the motor shaft 12, coupling 14, aspirator shaft 16 and aspirator tip 18 are hollow so as to allow air or other gas to be drawn into the liquid being aerated.

As discussed above, the composite aspirator shaft 16 for the mechanical aerator is formed of fiberglass-reinforced phenolic resin that reduces the amount of vibration that is transferred to the motor 10 or its bearings to extend motor/bearing life. When the aspirator tip 18 is rotated in a liquid, fluidic forces are transferred to the aspirator shaft 16. The aspirator shaft 16 and/or the coupling 14 attenuates the forces because the composite aspirator shaft and/or coupling material has a flexural modulus, or ratio, within the elastic limit of any applied stress, and is sufficiently low to allow the transfer of the flexural or oscillatory energy into heat within the shaft and/or coupling instead of conveying the energy in the form of vibration/oscillations along the axial length of the shaft and coupling to the motor.

In a preferred embodiment, a 27.5" shaft with a 0.63" outer diameter and 0.5" inner diameter incorporates 13-30% fiberglass by total volume, weighs ~109 grams, and rotates a tip weighing ~322 grams. This embodiment transfers ¼ of the vibrational energy to the motor/bearings. In one embodiment, the weave of the fiberglass is comprised of primary strands oriented on ~0.5 mm centers and oriented into a square weave pattern. Testing has found that this material resists abrasion better in wastewater than stainless steel.

As illustrated in the diagrams (not to scale) of FIGS. 2A-C, the self-centering coupler is formed from a hollow body 20 having a cylindrical cavity with a diameter sufficient for insertion of the aspirator shaft at one end and the motor shaft at the other end. Both ends 22 are threaded and have longitudinal slots so as to form a plurality of leafs 24. Corresponding nuts 26 for each end include an internal threaded portion 28 at one end and a tapered portion 29 at the other end. The nuts 26 are screwed on to the threaded end portions 22 of the hollow body 20 and the tapered portions 29 of the nuts 26 engage the outermost threads to compress the leafs 24 inwardly so as to frictionally engage corresponding shafts in a self-centering manner. The corresponding threads and nuts at each end are threaded in such a manner (i.e., the nuts are oppositely threaded) such that the rotational force of the motor shaft causes the coupler to tighten. To assist in assembly and disassembly, flats 25 can be provided on hollow body 20 so that a wrench or other tool can be used to control rotation of the hollow body 20.

The unique mechanical properties of the composite shaft and/or coupler relate directly to mitigating the effects of dynamic vibration energy conveyed to the motor assembly, and the associated wear effects such vibration imparts upon the operational life of the motor, along with the wear mitigating effects realized by a explicit selection of constituent materials comprising the composite shaft.

The composite shaft is preferably comprised of a material with a flexural modulus, or the ratio, within the elastic limit of any applied stress and sufficiently low to allow the transference of the flexural or oscillatory energy to be translated into heat within the structure of the material instead of conveying the energy in the form of vibration/oscillations along the axial length of the shaft, and thus to the bearings locating the shaft in place in coordination with the aerator motor assembly.

This application is a classic example of a fluidic-mass-spring dampener, in which the amplitude of the oscillations of system comprised of the motor assembly and the composite shaft assembly, when coupled to the fluidic operating environment and its dampening factor, dependant upon the viscosity of the fluid, comprise such a system wherein the system reduces the amplitude of the oscillations of the components within, and up to, the point of becoming a critically damped system.

Empirical observations made of the comparisons of each such described systems have yielded data that suggests that the damping factor of the composite shaft, when compared to the prior art stainless shaft, yields a ratio of ~0.25% in favor of the composite shaft when measured as a direct data point relating to the mass/velocity relationship of the complete assembly in operation.

A secondary improvement over prior art aeration shafts and the like relates to the ability of the shaft constituent material to resist abrasion presented by materials found in the fluid which may be introduced into the system within its operating life. Examples of such materials in the wastewater environment include: hair, cellulose fiber, polymer fibers, and other material other than the human waste for which the system was originally developed to process. There has been a great deal of observation of extreme abrasive wear perpendicular to the axial center of the shaft material due to the entanglement of these or other foreign materials around the shaft diameter. Over time, wear on a magnitude sufficient to actually cut through the wall thickness of the stainless steel shaft has been observed. Use of embodiments of the composite shaft in this application dramatically mitigate the effects of wear/cutting of the shaft perpendicular to its axis by foreign matter being entrapped around it, by the rotation of the shaft in the operating fluid, through the use of an incorporation of a glass fiber material or similar fiber material within the matrix of materials which comprise the composite shaft. The incorporation of a material in this composite shaft which is of a more abrasion resistant nature than the stainless steel, aids in the prevention of wear on the shaft. Selection of the material incorporated into the matrix comprising the composite shaft can be tailored to be comprised of a material with the physical characteristics necessary to actually abrade and liberate any foreign material which may become entangled onto the shaft, without the shaft suffering any significant adverse effects to its desired geometry or function.

In one embodiment to an aerator for mixing and adding air to wastewater and for receiving rotational forces from a motor, the aerator comprises: a hollow aspirator shaft for connection at one end to the motor; and an aspirator tip connected to another end of the aspirator shaft opposite the end connected to the motor; wherein the hollow tube substantially attenuates transmission of vibrational energy from the aspirator tip to the motor. Optionally, the hollow aspirator shaft is attached to a shaft of the motor by a self-centering coupler. The self-centering coupler is formed from a hollow body having a cylindrical cavity with a diameter sufficient for insertion of the aspirator shaft at one end and the motor shaft at the other end. Both ends are threaded and have longitudinal slots so as to form a plurality of leafs. Corresponding nuts for each end include an internal threaded portion at one end and a tapered portion at the other end. The nuts are screwed on to the threaded portions of the hollow body and the tapered portions of the nuts compress the leafs engage corresponding shafts in a self-centering manner.

In another embodiment to an aerator for mixing and adding air to wastewater and for receiving rotational forces from a motor, the aerator comprises: a hollow aspirator shaft for connection at one end to a motor, the hollow aspirator shaft comprising from about 13 percent to about 30 percent fiberglass by total volume; and an aspirator tip connected to another end of the hollow tube opposite the end connected to the motor. Again, the use of a self-centering coupler is optional.

In a further embodiment to an aerator for mixing and adding air to wastewater and for receiving rotational forces from a motor, the aerator comprises: a hollow aspirator shaft for connection at one end to a motor, the hollow aspirator shaft being impermeable to air and comprising a fiberglass the outer surface; and an aspirator tip connected to another end of the hollow aspirator shaft opposite the end connected to the motor. The aspirator tip can be a propeller or a venturi pump and a self-centering coupling is optional.

In another embodiment to a method for attenuating transmission of vibrational energy to a motor in a wastewater treatment system, the method comprises: rotating the motor disposed above wastewater to provide rotational energy to a shaft; coupling rotational energy from the shaft to an aspirator tip submerged in the wastewater to cause the aspirator tip to rotate; and damping vibrational energy generated at the rotating aspirator tip so as to substantially attenuate the amount of vibrational energy that reaches the motor.

Yet another embodiment is drawn to a method for reducing abrasion in a wastewater treatment system, the method comprising: rotating a motor disposed above wastewater to provide rotational energy to a fiberglass shaft formed of fiberglass-reinforced phenolic resin, the shaft being at least partially submerged in the wastewater; and coupling rotational energy from the fiberglass shaft to an aspirator tip submerged in the wastewater to cause the aspirator tip to rotate the fiberglass shaft, wherein the fiberglass shaft resists abrasion by the wastewater.

Preferred and alternate embodiments have now been described in detail. It is to be noted, however, that these embodiments are merely illustrative of the principles underlying the inventive concept of the present invention. It is therefore contemplated that various modifications of the disclosed embodiments will be apparent to persons of ordinary skill in the art, without departing from the scope of the present invention. For example, fluids other than air, as well as liquids other than wastewater, may be employed with the apparatus and method of the present invention. Similarly, any material suitable for a particular application can be used, including but not limited to various plastics, metals, ceramics, and combinations thereof.

A system and method for providing an aspirator has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. An aerator for mixing and adding air to wastewater and for receiving rotational forces from a motor, the aerator comprising:
   a hollow aspirator shaft for connection at one end to the motor; and an aspirator tip connected to another end of the hollow aspirator shaft opposite the end connected to the motor;
   wherein the aspirator shaft is comprised of material that substantially attenuates transmission of vibrational energy from the aspirator tip to the motor.

2. The aerator of claim 1, wherein the hollow aspirator shaft is formed from fiberglass-reinforced phenolic resin and incorporates 13-30% fiberglass by total volume.

3. The aerator of claim 1, wherein the hollow aspirator shaft transfers only ¼ of the vibrational energy from the aspirator tip to the motor and its bearings.

4. The aerator of claim 1, further comprising a self-centering coupling between the hollow aspirator shaft and a motor shaft of the motor, wherein the self-centering coupling comprises:
   a hollow body having a cylindrical cavity with a diameter sufficient for insertion of the aspirator shaft at one end and the motor shaft at the other end, wherein both ends are threaded and have longitudinal slots so as to form a plurality of leafs;
   corresponding nuts for each end, wherein the nuts include an internal threaded portion at one end and a tapered portion at the other end;
   wherein when the nuts are screwed on to the threaded end portions of the hollow body, the tapered portions of the nuts engage the outermost threads to compress the leafs inwardly so as to frictionally engage corresponding shafts in a self-centering manner.

5. The aerator of claim 4, wherein corresponding threads and nuts at each end of the hollow body are threaded in the same direction.

6. The aerator of claim 4, further comprising flats on a central portion of the hollow body so that a wrench or other tool can be used to control rotation of the hollow body.

7. The aerator of claim 4, wherein the self-centering coupling is formed from material selected from the group consisting of corrosive-resistant metal, nylon, and fiberglass-reinforced phenolic resin.

8. An aerator for mixing and adding air to wastewater and for receiving rotational forces from a motor, the aerator comprising:
   a hollow aspirator shaft for connection at one end to a motor, the hollow aspirator shaft formed from fiberglass-reinforced phenolic resin comprising from about 13 percent to about 30 percent fiberglass by total volume; and
   an aspirator tip connected to another end of the hollow aspirator shaft opposite the end connected to the motor.

9. The aerator of claim 8, wherein the hollow aspirator shaft transfers only ¼ of the vibrational energy from the aspirator tip to the motor and its bearings.

10. The aerator of claim 8, further comprising a self-centering coupling between the hollow aspirator shaft and a motor shaft of the motor, wherein the self-centering coupling comprises:
    a hollow body having a cylindrical cavity with a diameter sufficient for insertion of the aspirator shaft at one end and the motor shaft at the other end, wherein both ends are threaded and have longitudinal slots so as to form a plurality of leafs;
    corresponding nuts for each end, wherein the nuts include an internal threaded portion at one end and a tapered portion at the other end;
    wherein when the nuts are screwed on to the threaded end portions of the hollow body, the tapered portions of the nuts engage the outermost threads to compress the leafs inwardly so as to frictionally engage corresponding shafts in a self-centering manner.

11. The aerator of claim 10, wherein corresponding threads and nuts at each end of the hollow body are threaded in the same direction.

12. The aerator of claim 10, further comprising flats on a central portion of the hollow body so that a wrench or other tool can be used to control rotation of the hollow body.

13. The aerator of claim 10, wherein the self-centering coupling is formed from material selected from the group consisting of corrosive-resistant metal, nylon, and fiberglass-reinforced phenolic resin.

14. An aerator for mixing and adding air to wastewater and for receiving rotational forces from a motor, the aerator comprising:
    a hollow aspirator shaft for connection at one end to a motor, the hollow aspirator shaft being impermeable to air and comprising a fiberglass outer surface; and
    an aspirator tip connected to another end of the hollow aspirator shaft opposite the end connected to the motor, wherein the aspirator tip is selected from the group consisting of: a propeller and a venturi pump.

15. The aerator of claim 14, wherein the hollow aspirator shaft is formed from fiberglass-reinforced phenolic resin and incorporates 13-30% fiberglass by total volume.

16. The aerator of claim 14, wherein the hollow aspirator shaft transfers only ¼ of the vibrational energy from the aspirator tip to the motor and its bearings.

17. The aerator of claim 14, further comprising a self-centering coupling between the hollow aspirator shaft and a motor shaft of the motor, wherein the self-centering coupling comprises:

a hollow body having a cylindrical cavity with a diameter sufficient for insertion of the aspirator shaft at one end and the motor shaft at the other end, wherein both ends are threaded and have longitudinal slots so as to form a plurality of leafs;

corresponding nuts for each end, wherein the nuts include an internal threaded portion at one end and a tapered portion at the other end;

wherein when the nuts are screwed on to the threaded end portions of the hollow body, the tapered portions of the nuts engage the outermost threads to compress the leafs inwardly so as to frictionally engage corresponding shafts in a self-centering manner.

18. The aerator of claim 17, wherein corresponding threads and nuts at each end of the hollow body are threaded in the same direction.

19. The aerator of claim 17, further comprising flats on a central portion of the hollow body so that a wrench or other tool can be used to control rotation of the hollow body.

20. The aerator of claim 17, wherein the self-centering coupling is formed from material selected from the group consisting of corrosive-resistant metal, nylon, and fiberglass-reinforced phenolic resin.

* * * * *